US012780223B2

(12) United States Patent
Thomas

(10) Patent No.: US 12,780,223 B2
(45) Date of Patent: Nov. 3, 2026

(54) SAFETY MANAGEMENT USING CONTEXT-AWARE SAFETY DIAGNOSTICS

(71) Applicant: QUALCOMM Incorporated, San Diego, CA (US)

(72) Inventor: Bijo Thomas, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 18/595,278

(22) Filed: Mar. 4, 2024

(65) Prior Publication Data

US 2025/0276705 A1 Sep. 4, 2025

(51) Int. Cl.
*B60W 50/02* (2012.01)
*B60W 50/04* (2006.01)
*B60W 50/00* (2006.01)

(52) U.S. Cl.
CPC ........ *B60W 50/0205* (2013.01); *B60W 50/04* (2013.01); *B60W 2050/0008* (2013.01)

(58) Field of Classification Search
CPC ............. B60W 50/0205; B60W 50/04; B60W 2050/0008
USPC .......................................................... 701/29.1
See application file for complete search history.

(56) References Cited

U.S. PATENT DOCUMENTS 8,161,482 B1 * 4/2012 Sakarda ................ G06F 9/5027 718/104
2023/0273873 A1 * 8/2023 Patki ................... G06F 11/3656 714/38.11
2024/0402250 A1 * 12/2024 Hukerikar ........ G01R 31/31901

OTHER PUBLICATIONS

Shibahara S., "Functional Safety SoC for Autonomous Driving", 2018 IEEE Custom Integrated Circuits Conference (CICC), IEEE, Apr. 8, 2018, pp. 1-8, XP033339170, DOI: 10.1109/CICC.2018. 8357065, abstract paragraphs [000I], [OOII], [OIII], [III.A], [OOOIV], [OOOV] figures 2, 3, 4, 5, 13, 14.

Tan R., "A Safety Concept for Camera Based ADAS Based on MultiCore MCU", IEEE International Conference on Vehicular Electronics and Safety, Dec. 16-17, 2014, pp. 1-6.

* cited by examiner

*Primary Examiner* — Isaac G Smith
(74) *Attorney, Agent, or Firm* — Seyfarth Shaw LLP

(57) ABSTRACT

A method includes receiving application use case context information for context-aware safety management for an advanced driver-assistance system (ADAS) and/or an autonomous driving system-on-a-chip (SoC). The method also includes selecting a group of components of the SoC for running a selected subset of diagnostic procedures based on application use case context information. The method further includes identifying the selected subset of diagnostic procedures based on the group of components of the SoC associated with the use case context information. The selected subset of diagnostic procedures may be a subset of stored diagnostic procedures. The method still further includes triggering the selected subset of diagnostic procedures and performing the selected subset of diagnostic procedures based on the triggering.

20 Claims, 5 Drawing Sheets

SAFETY MANAGEMENT USING CONTEXT-AWARE SAFETY DIAGNOSTICS

FIELD OF THE DISCLOSURE

Aspects of the present disclosure generally relate to advanced driver-assistance systems (ADASs), and more particularly to safety management using context-aware safety diagnostics.

BACKGROUND

Advanced driver-assistance systems (ADASs) leverage a combination of sensors, cameras, and artificial intelligence to enhance vehicle safety and driving comfort. The systems often employ an array of technologies including computer vision, and Global Positioning System (GPS), to continuously monitor the vehicle's surroundings and provide real-time feedback to the driver. ADASs encompass a wide range of functionalities, from basic features such as lane departure warnings, automatic emergency braking, and blind spot detection to more sophisticated capabilities such as adaptive cruise control and lane-keeping assist. Some ADAS features even extend to semi-autonomous driving, allowing the vehicle to take control of steering, acceleration, and braking in certain conditions. An integration of machine learning functions enables an ADAS to adapt and improve over time, enhancing the ability of the system to predict and react to various road scenarios. It would be desirable to improve advanced driver-assistance systems.

SUMMARY

In some aspects of the present disclosure, a method includes receiving application use case context information for context-aware safety management for an advanced driver-assistance system (ADAS) and/or an autonomous driving system-on-a-chip (SoC). The method also includes selecting a group of components of the SoC for running a selected subset of diagnostic procedures based on application use case context information. The method further includes identifying the selected subset of diagnostic procedures based on the group of components of the SoC associated with the use case context information. The selected subset of diagnostic procedures may be a subset of stored diagnostic procedures. The method still further includes triggering the selected subset of diagnostic procedures and performing the selected subset of diagnostic procedures based on the triggering.

Other aspects of the present disclosure are directed to an apparatus. The apparatus includes an ADAS and/or an autonomous driving SoC configured to perform a selected subset of diagnostic procedures based on a triggering and a controller. The controller is configured to select a group of components of the SoC for running the selected subset of diagnostic procedures based on application use case context information. The controller is also configured to identify the selected subset of diagnostic procedures based on the group of components of the SoC associated with the use case context information. The controller is still further configured to trigger the selected subset of diagnostic procedures.

Other aspects of the present disclosure are directed to an apparatus. The apparatus has at least one memory and one or more processors coupled to the at least one memory. The processor(s) is configured to receive application use case context information for context-aware safety management for an ADAS and/or an autonomous driving SoC. The processor is also configured to select a group of components of the SoC for running a selected subset of diagnostic procedures based on application use case context information. The processor is further configured to identify the selected subset of diagnostic procedures based on the group of components of the SoC associated with the use case context information, the selected subset of diagnostic procedures being a subset of stored diagnostic procedures. The processor is still further configured to trigger the selected subset of diagnostic procedures and perform the selected subset of diagnostic procedures based on the triggering.

In still other aspects of the present disclosure, a non-transitory computer-readable medium with program code recorded thereon is disclosed. The program code is executed by at least one processor and includes program code to receive application use case context information for context-aware safety management for an ADAS and/or an autonomous driving SoC. The program code also includes program code to select a group of components of the SoC for running a selected subset of diagnostic procedures based on application use case context information. The program code further includes program code to identify the selected subset of diagnostic procedures based on the group of components of the SoC associated with the use case context information, the selected subset of diagnostic procedures being a subset of stored diagnostic procedures. The program code still further includes program code to trigger the selected subset of diagnostic procedures and perform the selected subset of diagnostic procedures based on the triggering.

Other aspects of the present disclosure are directed to an apparatus. The apparatus includes means for receiving application use case context information for context-aware safety management for an ADAS and/or an autonomous driving SoC. The apparatus also includes means for selecting a group of components of the SoC for running a selected subset of diagnostic procedures based on application use case context information. The apparatus further includes means for identifying the selected subset of diagnostic procedures based on the group of components of the SoC associated with the use case context information, the selected subset of diagnostic procedures being a subset of stored diagnostic procedures. The apparatus still further includes means for triggering the selected subset of diagnostic procedures and means for performing the selected subset of diagnostic procedures based on the triggering.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
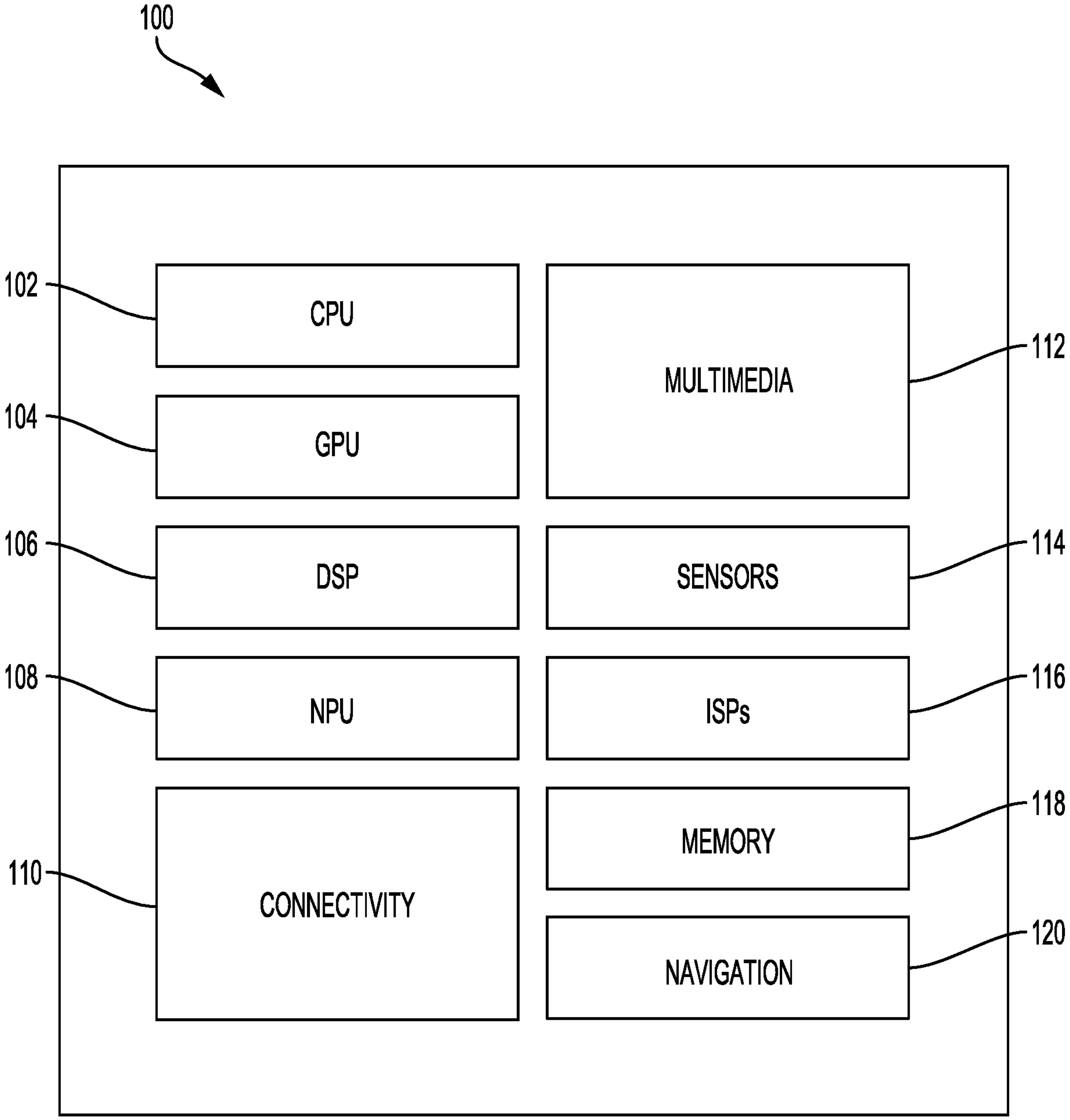
FIG. 1 illustrates an example implementation of a system-on-a-chip (SoC), in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Automotive advanced driver-assistance systems (ADASs) and autonomous driving systems fulfill functional safety requirements mandated by safety standards for road vehicles. Functional safety in driver-assistance systems prevents risks to humans due to failures of components in the driver-assistance system. To satisfy the functional safety requirements, vehicles often implement safety mechanisms and diagnostic measures at the hardware, software, and system levels. The safety mechanisms detect and control systematic and hardware random faults. To operate safely, vehicles should detect and address faults causing malfunctioning within a safety relevant time interval, such as a fault tolerant time interval (FTTI), so that the malfunctioning does not result in a hazardous event. For reference, FTTI is often in the range of 80-500 milliseconds, but may be dependent on the ADAS application. Therefore, most vehicles execute diagnostic tests periodically (e.g., once every FTTI) to detect faults during operation of the vehicle.

Safety relevant systems often perform periodic diagnostic tests to improve diagnostic coverage. However, these diagnostic tests can be destructive and may require expensive state saves and restores during run-time to avoid adverse impact to system functionality. Additionally, diagnostic tests consume system resources, such as memory. Performing too many diagnostics self-tests may also result in starving the ADAS application of system resources. Hence, diagnostic tests can impact the system functional behavior and performance if all the potential diagnostics tests are triggered at run-time. Therefore, it is desirable to identify a subset of periodic diagnostics that should be performed at run-time (e.g., specific tests targeting a subsystem), and the point in execution to run the tests, instead of performing all tests periodically.

Various aspects of the present disclosure are directed to safety management using context-aware safety diagnostics. In some aspects, an ADAS system-on-a-chip (SoC) includes one or more schedulers. Probes or hooks connected to the schedulers may collect application use case context information. Then, a context analyzer and safety management module analyzes the run-time status of the components that are active in the specific application or use case context. The context analyzer and safety management module then identifies a subset of diagnostic procedures based on the use case context. The ADAS SoC, or an external device, may perform targeted diagnostic measures to improve diagnostic coverage of latent faults based on the identified subset of diagnostic procedures.

To perform the targeted diagnostics, the context analyzer and safety management module generates a diagnostics trigger signal and communicates the list of diagnostic procedures to be performed to a safety monitor or a diagnostics application. Upon receiving the diagnostics trigger signal, the safety monitor or diagnostics application triggers the specific diagnostic procedures for the components identified by the signal or diagnostic message. These diagnostic procedures might be in addition to of any bare minimum periodic tests run once per FTTI.

The application use case context analyzer diagnostic subset identification logic may be implemented in the ADAS SoC or external device using hardware and/or software. The targeted diagnostics may be triggered internally or by another device via an interrupt. In some examples, the targeted diagnostics may be triggered externally via a dedicated diagnostics trigger pin, with additional detailed information communicated via a communication interface. As discussed, the targeted diagnostics may identify the subset of diagnostic procedures to execute and/or when to execute the subset of diagnostic procedures based on application use case context information.

Particular aspects of the subject matter described in this disclosure can be implemented to realize one or more of the following potential advantages. In some examples, the described techniques, such as context-aware safety diagnostic testing, enables the identification and execution of a subset of safety diagnostics based on application use case context information. Other advantages include techniques for identifying an appropriate diagnostic procedure to perform at any instance of time (e.g., the subset of diagnostic procedures and priority or order of execution), as well as reducing the overhead associated with diagnostic procedures being executed periodically. Because only an identified subset of diagnostic procedures are executed, the overhead due to running the diagnostic procedures may be reduced. Advantages include saved system resources, less disruption seen by the user, and better system operation.

As used herein, the term "vehicle" refers to various types of motorized vehicles and heavy equipment. Vehicles may be capable of transporting people, animals, or cargo, particularly vehicles capable of operating in an autonomous and/or semi-autonomous mode. For example, a vehicle may include a motorcycle, an automobile, a truck, a van, a bus, a train or a tram, a boat or ship, and an aircraft including a helicopter, a plane, etc. Vehicles may also include machinery operated by an operator that may include an autonomous and/or semi-autonomous mode, such as a crane (e.g., a sky crane, a gantry crane, a self-propelled crane, etc.), a bulldozer, a grain combine, a tractor, farm machinery, etc. Vehicles may be land base, waterborne or aerial vehicles.

The term "autonomous vehicle" refers to various types of vehicles that include at least a computing device configured to perform autonomous navigation and/or control, automate, adapt, or enhance various vehicle systems (e.g., braking, steering, acceleration, machinery controls, etc.) during at least a portion of operation of the vehicle. For example, an autonomous vehicle may be a self-driving vehicle or a vehicle including ADAS features. As another example, an autonomous vehicle may be farm machinery configured to perform a pre-programmed planting, harvesting or plowing operation.

The term "diagnostic procedure" refers to procedures for electrical hardware components, such as a central processing unit, that involve a series of systematic checks and tests designed to identify and isolate faults or performance issues. These procedures often start with basic checks such as ensuring proper power supply and connection integrity, then progress to more sophisticated tests using specialized diagnostic software or tools. These tests can include scanning for physical damage, checking temperature levels, running stress tests to evaluate performance under load, and examining the component's interaction with other system components such as random-access memory (RAM) and storage devices. The objective of diagnostic procedures is to identify specific problems, ranging from overheating and circuit failures to compatibility issues or firmware corruption, enabling targeted repairs or optimizations to restore intended functioning of the component.

FIG. 1 illustrates an example implementation of a system-on-a-chip (SoC) 100, which may include a central processing unit (CPU) 102 or a multi-core CPU configured for driver assistance. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a Global Positioning System.

The SoC 100 may be based on a reduced instruction set computing (RISC) architecture, such as an advanced RISC machine (ARM) or RISC-five (RISC-V). In aspects of the present disclosure, the instructions loaded into the CPU 102 may include code to receive application use case context information for context-aware safety management for an advanced driver-assistance system (ADAS) SoC and/or an autonomous driving SoC. The instructions loaded into the CPU 102 may additionally include code to select a group of components of the SoC 100 for running a selected subset of diagnostic procedures based on application use case context information. The instructions loaded into the CPU 102 may also include code to identify the selected subset of diagnostic procedures based on the group of components of the SoC 100 associated with the use case context information, the selected subset of diagnostic procedures being a subset of stored diagnostic procedures. The instructions loaded into the CPU 102 may further include code to trigger the selected subset of diagnostic procedures. The instructions loaded into the CPU 102 may also include code to perform the selected subset of diagnostic procedures based on the triggering.

Autonomous vehicles may be configured to communicate using vehicle-based wireless communications. The cellular vehicle-to-everything (C-V2X) protocol serves as the foundation for vehicle-based wireless communications. In particular, C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation Society (ITS) 5.9 gigahertz (GHz) spectrum that is independent of a cellular network.

A second transmission mode includes vehicle-to-network (V2N) communications in mobile broadband systems and technologies, such as third generation (3G) wireless mobile communication technologies (e.g., global system for mobile communications (GSM) evolution (EDGE) systems, code division multiple access (CDMA) 2000 systems, etc.), fourth generation (4G) wireless mobile communication technologies (e.g., long term evolution (LTE) systems, LTE-Advanced systems, mobile Worldwide Interoperability for Microwave Access (mobile WiMAX) systems, etc.), fifth generation (5G) wireless mobile communication technologies (e.g., 5G new radio (NR) systems), etc.

Of particular usefulness to autonomous driving are the V2V communications between or among motor vehicles.

V2V systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2V onboard equipment frequently (e.g., up to 20 times per second) transmit their vehicle information in packets referred to as basic safety messages (BSM). Autonomous vehicles equipped with an ADAS may receive and use such V2V communications to control their speed and position with respect to other V2V vehicles, and form a caravan that allows the vehicles to make coordinated maneuvering and navigation decisions.

The ADAS features installed in different vehicles may vary dramatically. For example, high-end vehicles may include precise sensors and fully autonomous driving systems that reliably maintain the vehicle at a certain speed, within a certain distance of the edges of the driving lane, and within a certain distance from other vehicles, etc. However, ADAS features in older or less expensive vehicles may not be as accurate or reliable. In addition, some vehicles are not fully autonomous all the time, such as when the human driver takes manual control of the vehicle. Further, some of the vehicles may have reduced capabilities due to normal wear and tear, inadequate maintenance, or age. Older vehicles may have outdated sensors and lesser degrees of autonomy (e.g., an accident avoidance system that applies brakes, an adaptive cruise control that maintains a certain distance from other vehicles, etc.).

In order for autonomous vehicles to work effectively together as part of a caravan, the ADAS in each vehicle may take into consideration the varying levels of capability and autonomy of surrounding vehicles that are effective at each instant. In addition, the ADAS may adapt to other dynamic factors such as their driver's preferences, driver engagement, individual programing, levels of maintenance and use, etc., that could alter the behavior of surrounding vehicles. These factors have an impact on the capabilities, behaviors, and level of autonomy of surrounding vehicles, but can generally only be known by observing and analyzing the vehicle while the vehicle is in operation.

Figure 2A:
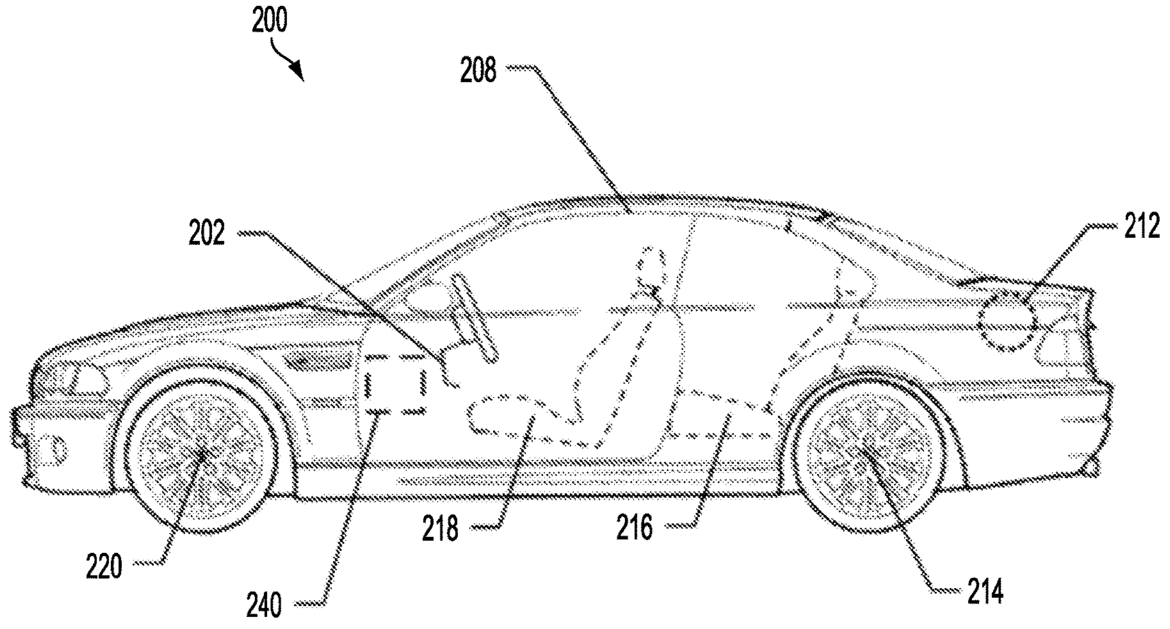
FIGS. 2A and 2B are side and top views illustrating a vehicle implementing advanced driver-assistance systems (ADASs), in accordance with various aspects of the present disclosure.
Figure 2B:
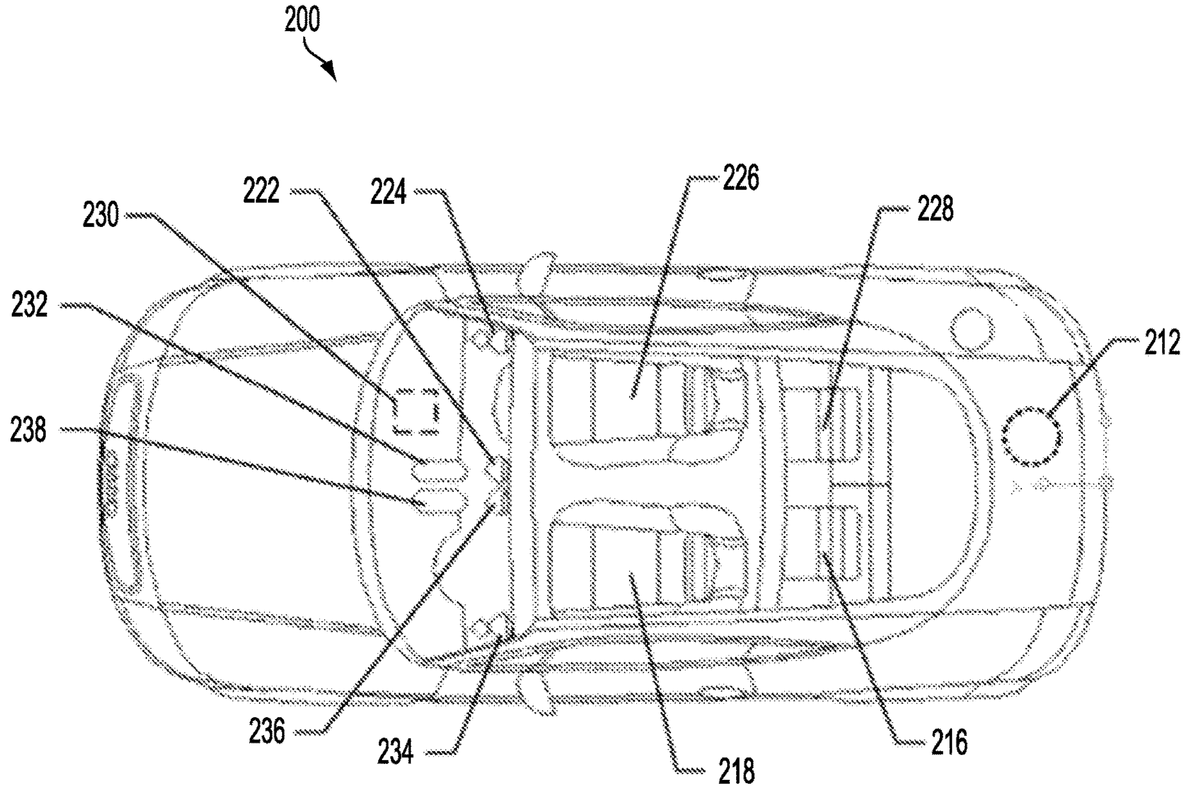

FIGS. 2A and 2B are side and top views illustrating a vehicle 200 implementing an ADAS, in accordance with various aspects of the present disclosure. The vehicle 200 may include a group of sensors 202-238 disposed in or on the vehicle 200 that are used for various purposes involved in autonomous and semi-autonomous navigation as well as sensor data for objects and people in or on the vehicle 200. The sensors 202-238 may include one or more of a wide variety of sensors capable of detecting a variety of information useful for navigation and collision avoidance. Each of the sensors 202-238 may be in wired or wireless communication with a control unit 240, as well as with each other. In particular, the sensors may include one or more cameras 222, 236 or other optical sensors or photo optic sensors.

The sensors may further include other types of sensors, such as object detection and ranging sensors 232, infrared (IR) sensors 238, and ultrasonic sensors. The sensors may further include tire pressure sensors 214, 220, satellite geo-positioning sensors 208, impact sensors 230, microphones 224, 234, occupancy sensors 212, 216, 218, 226, 228, vibration sensor 202, humidity sensors, temperature sensors, accelerometers, gyroscopes, gravimeters, force meters, stress meters, strain sensors, fluid sensors, chemical sensors, gas content analyzers, pH sensors, radiation sensors, Geiger counters, neutron detectors, biological material sensors, proximity sensors, and other sensors.

A control unit 240 may be configured with processor-executable instructions to perform various embodiments using information received from various sensors, such as the cameras 222, 236. In some examples, the control unit 240 may supplement the processing of camera images using distance and relative position (e.g., relative bearing angle) that may be obtained from object detection and ranging sensors 232 and/or infrared sensors 238. The control unit 240 may further be configured to control steering, braking, and speed of the vehicle 200 when operating in an autonomous or semi-autonomous mode using information about other vehicles determined using various aspects. In some implementations, the control unit 240 may include the SoC 100 illustrated with respect to FIG. 1.

Figure 3:
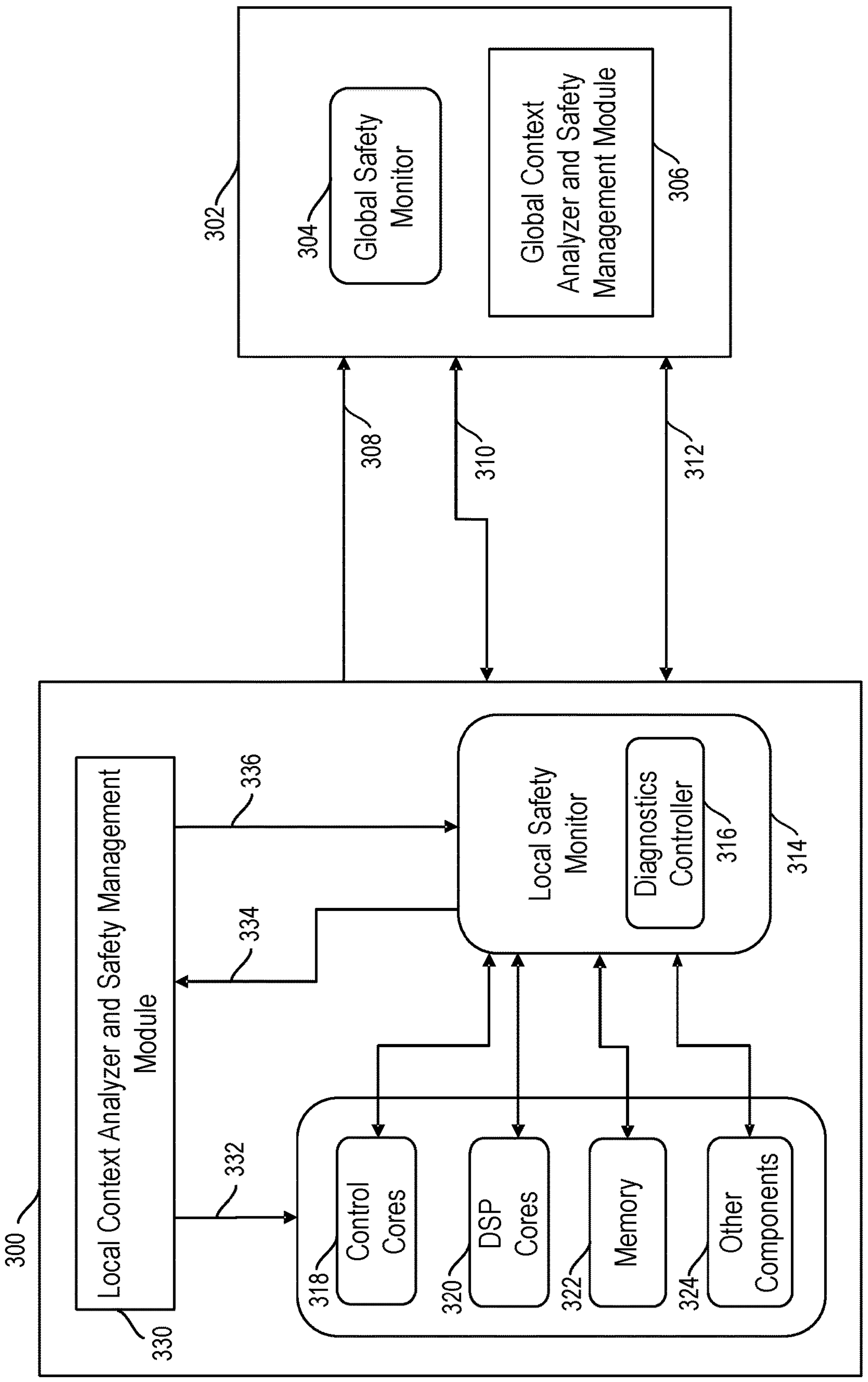
FIG. 3 is a block diagram illustrating an ADAS SoC in communication with an external device, in accordance with various aspects of the present disclosure.

FIG. 3 is a block diagram illustrating an ADAS SoC 300 in communication with an external device 302, in accordance with various aspects of the present disclosure. As illustrated in FIG. 3, the external device 302 includes a global safety monitor 304 and a global context analyzer and safety management module 306. The external device 302 is connected to the ADAS SoC 300 by a safety error pin 308, a diagnostics trigger pin 310, and a communication interface 312. The diagnostics trigger pin 310 may be a dedicated diagnostics trigger pin, such that the diagnostics trigger pin 310 only sends or receives information related to diagnostic procedures.

The ADAS SoC 300 includes a local safety monitor 314 that incorporates a diagnostics controller 316, the diagnostics controller 316 assisting the local safety monitor 314 with scheduling and performing diagnostic procedures. The local safety monitor 314 is connected to a group of functional blocks: control cores 318, digital signal processor (DSP) cores 320, memory 322, and other components 324. The other components 324 may be any hardware or software module of the ADAS SoC 300 that may execute diagnostic procedures to consistently achieve intended performance. For example, the ADAS SoC 300 may include a navigation module as one of the other components 324, such as the navigation module 120 discussed with respect to FIG. 1.

The functional blocks may be connected to a local context analyzer and safety management module 330 via an internal trigger input 332. The local context analyzer and safety management module 330 may also be connected to the local safety monitor 314 via a safety interrupt pin/signal 334 and a diagnostics trigger and interrupt pin/signal 336.

As discussed, various aspects of the present disclosure may be implemented to identify hardware and/or software modules and a relevant subset of diagnostic procedures based on active use case context information. Both the application use case context analysis and the identification of a subset of diagnostic procedures may be performed by the local context analyzer and safety management module 330 inside of the ADAS SoC 300 or by the global context analyzer and safety management module 306 in the external device 302 connected to ADAS SoC 300.

In some examples, the local context analyzer and safety management module 330 may receive application use case context information. The application use case context information may be received from various sources, such as a scheduler (not shown). For instance, the local context analyzer and safety management module 330 may receive processing timeframes from a scheduler configured to collect application use case context information. The local context analyzer and safety management module 330 may then select a group of components of the ADAS SoC 300 for running a selected subset of diagnostic procedures based on the application use case context information. For example, if the local context analyzer and safety management module 330 receives an indication that the ADAS SoC 300 is performing a use case that implements the DSP cores 320 and the memory 322, the local context analyzer and safety management module 330 may then select the DSP cores 320 and memory 322 for diagnostics.

The local context analyzer and safety management module 330 may then identify a subset of diagnostic procedures based on the group of components of the ADAS SoC 300 associated with the use case context information. In some examples, the selected subset of diagnostic procedures is a subset of stored diagnostic procedures. For example, if the DSP cores 320 and memory 322 are selected for diagnostics, the local context analyzer and safety management module 330 may select only the diagnostic procedures for testing the DSP cores 320 and memory 322. The local context analyzer and safety management module 330, or a device in communication with the local context analyzer and safety management module 330, may store various diagnostic procedures for each of the functional blocks. Therefore, by selecting only the diagnostic procedures for testing the DSP cores 320 and memory 322, the local context analyzer and safety management module 330 is selecting only a subset of these stored diagnostic procedures.

It is additionally contemplated that the local context analyzer and safety management module 330 could select a subset of the diagnostic procedures for individual components. For example, if the application use case context information indicates that the DSP cores 320 are performing a memory-intensive task, the local context analyzer and safety management module 330 may select only a diagnostic procedure to test the cache memory and a part of the computation logic and instruction set of the DSP cores 320.

After the local context analyzer and safety management module 330 identifies the selected subset of diagnostic procedures, the local context analyzer and safety management module 330 may then transmit a diagnostic procedure indication to the local safety monitor 314 via the diagnostics trigger and interrupt pin/signal 336. The diagnostic procedure indication may contain information related to selected subsets of diagnostic procedures, such as timeframes for the diagnostic procedures or the steps of the diagnostic procedures.

The local context analyzer and safety management module 330 may trigger the selected subset of diagnostic procedures by transmitting a trigger signal to the functional blocks (e.g., the control cores 318, DSP cores 320, memory 322, and/or other components 324). The trigger signal may include an indication as to when to start or stop the selected subset of diagnostic procedures. The local context analyzer and safety management module 330 may transmit the trigger signal via the internal trigger input 332. Additionally, or alternatively, the local context analyzer and safety management module 330 may transmit the trigger signal to the local safety monitor 314 via the diagnostics trigger and interrupt pin/signal 336.

The local safety monitor 314 and/or the functional blocks (e.g., the control cores 318, DSP cores 320, memory 322, and/or other components 324) may perform the selected subset of diagnostic procedures based on receiving the trigger signal. For example, the local safety monitor 314 may receive a diagnostic procedure indication from the local context analyzer and safety management module 330. Once the local safety monitor 314 receives the trigger signal, the local safety monitor 314 may perform all or part of the selected subset of diagnostic procedures indicated by the diagnostic procedure indication. For example, if the diagnostic procedure indication included a diagnostic procedure for testing the memory 322 for identifying memory related faults, the local safety monitor 314 initiates the diagnostic procedure for testing the memory 322 upon receiving the trigger signal from the local context analyzer and safety management module 330 via the diagnostics trigger and interrupt pin/signal 336. The local safety monitor 314 may transmit the results of the diagnostic procedures to the local context analyzer and safety management module 330 via the safety interrupt pin/signal 334.

In some examples, the external device 302 is additionally or alternatively implemented to perform context-aware safety diagnostic procedures. In these examples, the global context analyzer and safety management module 306 may perform a similar role as the local context analyzer and safety management module 330, instead of the local context analyzer and safety management module 330 performing some or all of the actions.

For instance, the global context analyzer and safety management module 306 may receive application use case context information via the safety error pin 308 and/or the communication interface 312. The application use case context information may be received from various sources, such as a scheduler or a set of schedulers (not shown). For instance, the global context analyzer and safety management module 306 may receive processing timeframes from a set of schedulers configured to collect application use case context information from respective subsystems in the ADAS SoC 300, such as the memory 322 and DSP cores 320. The global context analyzer and safety management module 306 may then select a group of components of the ADAS SoC 300 for running a selected subset of diagnostic procedures based on the application use case context information. For example, if the global context analyzer and safety management module 306 receives an indication that the ADAS SoC 300 is performing a use case that implements the control cores 318 and the memory 322, the global context analyzer and safety management module 306 may then select the control cores 318 and memory 322 for diagnostics.

The global context analyzer and safety management module 306 may identify a subset of diagnostic procedures based on the group of components of the SoC associated with the use case context information. In some examples, the selected subset of diagnostic procedures is a subset of stored diagnostic procedures. For example, if the control cores 318 and memory 322 are selected for diagnostics, the global context analyzer and safety management module 306 may select only the diagnostic procedures for testing the control cores 318 and memory 322. The global context analyzer and safety management module 306, or a device in communication with the global context analyzer and safety management module 306, may store various diagnostic procedures for each of the functional blocks. Therefore, by selecting only the diagnostic procedures for testing the control cores 318 and memory 322, the global context analyzer and safety management module 306 selects only a subset of these stored diagnostic procedures.

As discussed with respect to the local context analyzer and safety management module 330, it is additionally contemplated that the global context analyzer and safety management module 306 may select a subset of the diagnostic procedures for individual components. For example, if the application use case context information indicates that the control cores 318 are performing a memory-intensive task, the global context analyzer and safety management module 306 may select only a diagnostic procedure to test the cache memory of the control cores 318.

After the global context analyzer and safety management module 306 identifies the selected subset of diagnostic procedures, the global context analyzer and safety management module 306 may then transmit a diagnostic procedure indication to the global safety monitor 304, or to the local safety monitor 314 via the communication interface 312. The diagnostic procedure indication may include information related to selected subsets of diagnostic procedures, such as timeframes for the diagnostic procedures or the steps of the diagnostic procedures. The global context analyzer and safety management module 306 or the global safety monitor 304 may trigger the selected subset of diagnostic procedures by transmitting a trigger signal to the local safety monitor 314 via the diagnostics trigger pin 310 or the communication interface 312. The communication interface 312 may be implemented to communicate various forms of data between the ADAS SoC 300 and the external device 302, including control information and diagnostic trigger information. In some aspects, the communication interface 312 operates in accordance with a serial peripheral interface (SPI), although any other protocol is also contemplated. The diagnostics trigger pin 310 may operate in accordance with a general purpose input/output (GPIO) interface, although such an interface is non-limiting.

The local safety monitor 314 and/or the functional blocks (e.g., the control cores 318, DSP cores 320, memory 322, and/or other components 324) may perform the selected subset of diagnostic procedures in response to receiving the trigger signal. For example, the local safety monitor 314 may receive a diagnostic procedure indication from the global context analyzer and safety management module 306. Once the local safety monitor 314 receives the trigger signal, the local safety monitor 314 may perform all or part of the selected subset of diagnostic procedures indicated by the diagnostic procedure indication. For example, if the diagnostic procedure indication included a diagnostic procedure for testing the memory 322 for identifying memory related faults, the local safety monitor 314 initiates the diagnostic procedure for testing the memory 322 upon receiving the trigger signal from the global context analyzer and safety management module 306 via the diagnostics trigger pin 310 or communication interface 312. The local safety monitor 314 may transmit the results of the diagnostic procedures to the external device 302 via the safety error pin 308 or communication interface 312 or a combination of both. The safety error pin 308 or communication interface 312 or a combination of both may also transmit status-related information to the external device 302, such as voltage, power, and clock information.

Although FIG. 3 illustrates one possible configuration for implementing various aspects of the present disclosure, FIG. 3 is an example, and other configurations are possible. For instance, the functional blocks (e.g., the control cores 318, DSP cores 320, memory 322, and/or other components 324) may comprise any assortment of components that may specify diagnostic procedures to consistently achieve intended performance. Additionally, techniques for context-aware safety diagnostics may be performed internally by the ADAS SoC 300 (e.g., without one or more of the external device 302, safety error pin 308, diagnostics trigger pin 310, and communication interface 312). Techniques for context-aware safety diagnostics may additionally or alternatively be performed external to the ADAS SoC 300 (e.g., without one or more of the local context analyzer and safety management module 330, internal trigger input 332, safety interrupt pin/signal 334, and the diagnostics trigger and interrupt pin/signal 336).

The various components discussed throughout this disclosure may be either hardware or software components. For example, the global context analyzer and safety management module 306, global safety monitor 304, local context analyzer and safety management module 330, local safety monitor 314, diagnostics controller 316, scheduler, and the functional blocks (e.g., the control cores 318, DSP cores 320, memory 322, and/or other components 324) may be hardware and/or software components in various implementations of the discussed context-aware safety diagnostics techniques. For instance, the local context analyzer and safety management module 330 may be a software module running on a processor core that collects application use case context and the relevant set of components or sub-systems for diagnostics. Alternatively, the local context analyzer and safety management module 330 may be a dedicated hardware unit. Additionally, the discussed context-aware safety diagnostics techniques may be performed periodically. For example, the selected subset of diagnostic procedures may be identified and/or triggered once every fault tolerant time interval (FTTI) (e.g., every 80-500 milliseconds).

It is additionally contemplated that one or more components, such as the global context analyzer and safety management module 306 or the local context analyzer and safety management module 330, may perform actions based on the result of the diagnostic test. For example, if the DSP cores 320 return a failing diagnostics result, the local context analyzer and safety management module 330 may toggle the vehicle 200 from a self-driving mode to a manual-driving mode. Additionally, instead of receiving the application use case context information from a component, such as a scheduler, it is contemplated that the global context analyzer and safety management module 306 and/or the local context analyzer and safety management module 330 may have the application use case context information pre-stored in an internal memory component. For example, the application use case context information may be received as a result of pre-programming.

In some examples, one or more of the various components illustrated with respect to FIG. 3 may also trigger periodic baseline tests in addition to the selected subset of diagnostic procedures. For example, the global safety monitor 304 may trigger a temperature test every FTTI or every third FTTI, in addition to the selected subset of diagnostic procedures identified by the global context analyzer and safety management module 306.

Figure 4:
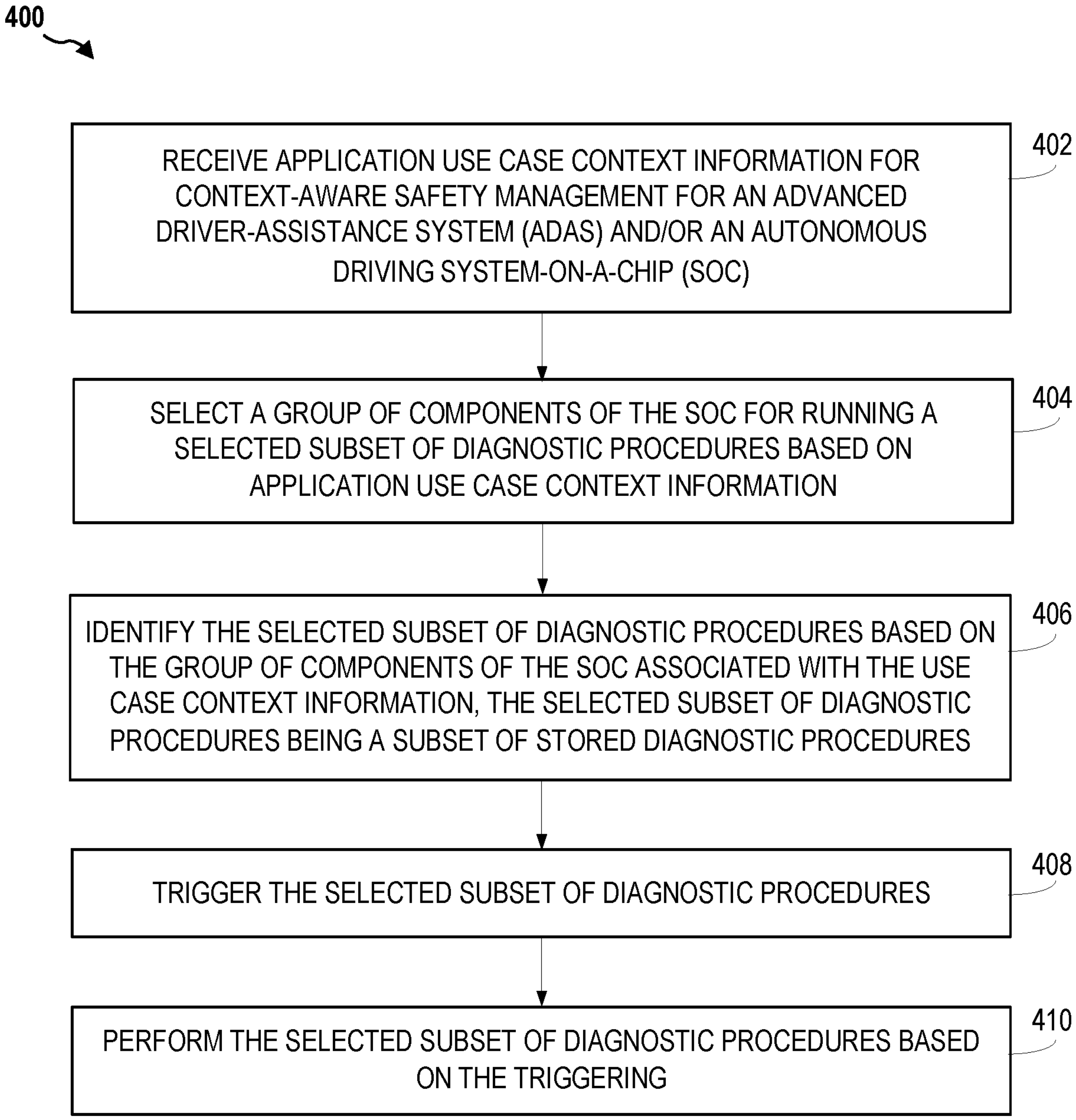
FIG. 4 is a flow diagram illustrating an example process performed, for example, by an ADAS SoC, in accordance with various aspects of the present disclosure.

FIG. 4 is a flow diagram illustrating an example process 400 performed, for example, by an ADAS SoC 300, in accordance with various aspects of the present disclosure. The process 400 may be additionally or alternatively be performed by one or more processors such as the CPU 102, GPU 104, and/or other processing unit (e.g., the external device 302).

In some aspects, the process 400 may include receiving application use case context information for context-aware safety management for an ADAS and/or an autonomous driving SoC (block 402). The SoC may comprise, for example, a group of functional blocks and a local safety monitor. The process 400 may also include selecting a group of components of the SoC for running a selected subset of diagnostic procedures based on application use case context information (block 404). The application use case context information may be received from a system scheduler configured to collect application use case context information.

The process 400 may further include identifying the selected subset of diagnostic procedures based on the group of components of the SoC associated with the use case context information, the selected subset of diagnostic procedures being a subset of stored diagnostic procedures (block 406). For example, if a local context analyzer and safety management module receives an indication that the ADAS SoC is performing a use case that implements memory, the local context analyzer and safety management module may then select diagnostic procedures for the memory.

The process 400 may still further include triggering the selected subset of diagnostic procedures (block 408). The triggering may occur once every fault tolerant time interval (FFTI) and be received via a dedicated diagnostics trigger pin coupled to the ADAS SoC. The ADAS SoC may further trigger periodic baseline tests in addition to the selected diagnostic procedures for the memory. The process 400 may additionally include performing the selected subset of diagnostic procedures based on the triggering (block 410). For example, the local safety monitor may receive a diagnostic procedure indication from the local context analyzer and safety management module. Once the local safety monitor receives the trigger signal, the local safety monitor may perform all or part of the selected subset of diagnostic procedures.

Figure 5:
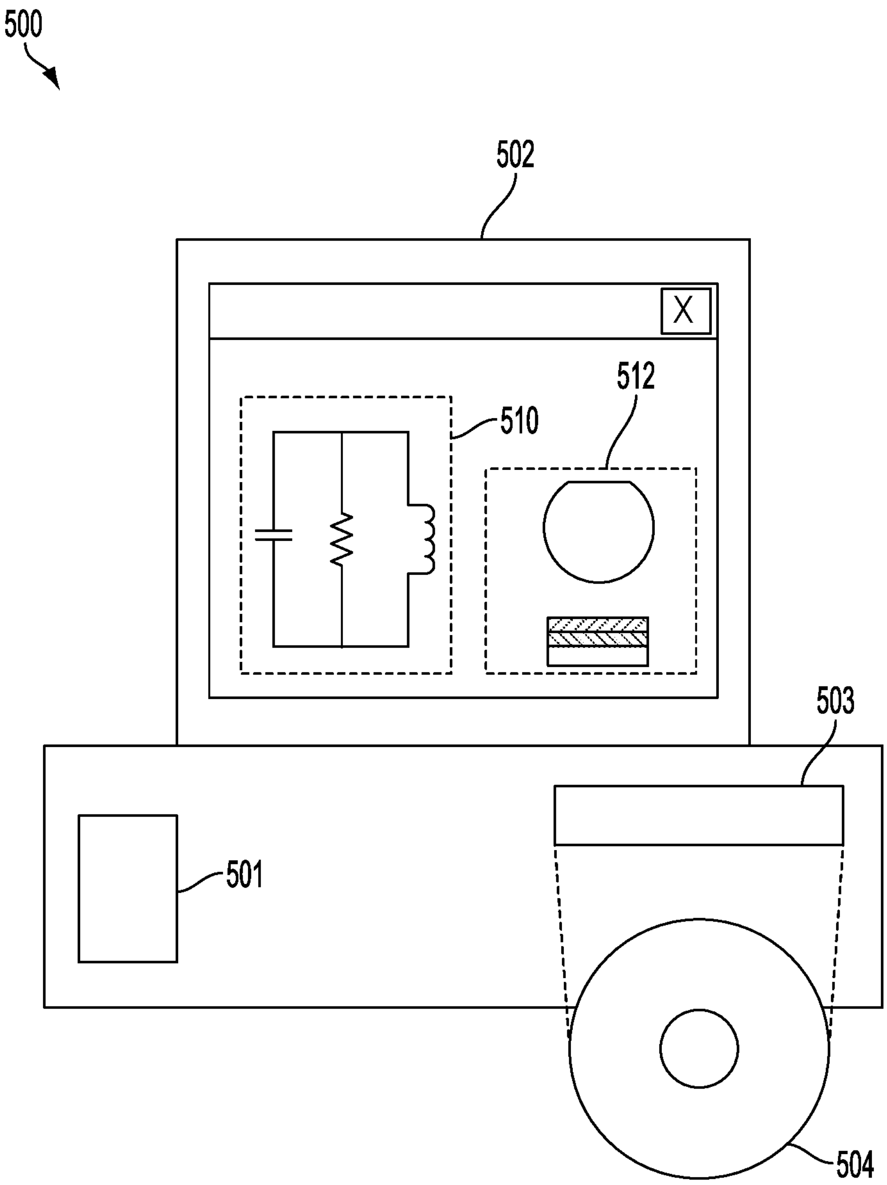
FIG. 5 is a block diagram illustrating a design workstation used for circuit, layout, and logic design of components, in accordance with various aspects of the present disclosure.

FIG. 5 is a block diagram illustrating a design workstation 500 used for circuit, layout, and logic design of a semiconductor component, such as the ADAS SoC 300, disclosed above. The design workstation 500 includes a hard disk 501 containing operating system software, support files, and design software such as Cadence or OrCAD. The design workstation 500 also includes a display 502 to facilitate design of a circuit 510 or a semiconductor component 512, such as the ADAS SoC 300. A storage medium 504 is provided for tangibly storing the design of the circuit 510 or the semiconductor component 512 (e.g., the ADAS SoC 300). The design of the circuit 510 or the semiconductor component 512 may be stored on the storage medium 504 in a file format such as GDSII or GERBER. The storage medium 504 may be a CD-ROM, DVD, hard disk, flash memory, or other appropriate device. Furthermore, the design workstation 500 includes a drive apparatus 503 for accepting input from or writing output to the storage medium 504.

Data recorded on the storage medium 504 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 504 facilitates the design of the circuit 510 or the semiconductor component 512 by decreasing the number of processes for designing semiconductor wafers.

Example Aspects

Aspect 1: A method, comprising: receiving application use case context information for context-aware safety management for an advanced driver-assistance system (ADAS) and/or an autonomous driving system-on-a-chip (SoC); selecting a group of components of the SoC for running a selected subset of diagnostic procedures based on application use case context information; identifying the selected subset of diagnostic procedures based on the group of components of the SoC associated with the use case context information, the selected subset of diagnostic procedures being a subset of stored diagnostic procedures; triggering the selected subset of diagnostic procedures; and performing the selected subset of diagnostic procedures based on the triggering.

Aspect 2: The method of Aspect 1, in which the triggering the selected subset of diagnostic procedures is via a dedicated diagnostics trigger pin.

Aspect 3: The method of Aspect 1 or 2, in which the application use case context information is received from the SoC and the triggering the selected subset of diagnostic procedures is via a global safety monitor.

Aspect 4: The method of any of the Aspects 1-3, in which the SoC comprises a group of functional blocks and a local safety monitor, the local safety monitor performing the selected subset of diagnostic procedures based on the triggering.

Aspect 5: The method of any of the Aspects 1-4, in which the triggering the selected subset of diagnostic procedures occurs once every fault tolerant time interval (FTTI).

Aspect 6: The method of any of the Aspects 1-5, further comprising triggering periodic baseline tests in addition to the selected subset of diagnostic procedures.

Aspect 7: The method of any of the Aspects 1-6, in which the application use case context information is received from a system scheduler, the system scheduler configured to collect application use case context information.

Aspect 8: The method of any of the Aspects 1-7, in which the application use case context information is received from a set of schedulers, each scheduler of the set of schedulers configured to collect application use case context information from respective subsystems in the SoC.

Aspect 9: An apparatus, comprising: an advanced driver-assistance system (ADAS) and/or an autonomous driving system-on-a-chip (SoC) configured to perform a selected subset of diagnostic procedures based on a triggering; and a controller configured: to select a group of components of the SoC for running the selected subset of diagnostic procedures based on application use case context information; to identify the selected subset of diagnostic procedures based on the group of components of the SoC associated with the use case context information; and to trigger the selected subset of diagnostic procedures.

Aspect 10: The apparatus of Aspect 9, in which the controller is external to the SoC.

Aspect 11: The apparatus of Aspect 9 or 10, in which the controller further comprises a global safety monitor that triggers the selected subset of diagnostic procedures.

Aspect 12: The apparatus of Aspect 9, in which the controller is internal to the SoC.

Aspect 13: The apparatus of any of the Aspects 9-12, in which the controller further comprises a dedicated diagnostics trigger pin that is coupled to the SoC.

Aspect 14: The apparatus of any of the Aspects 9-13, in which the SoC further comprises a group of functional blocks and a local safety monitor, the local safety monitor performing the selected subset of diagnostic procedures based on the triggering.

Aspect 15: The apparatus of any of the Aspects 9-14, in which the SoC further comprises a system scheduler configured to collect application use case context information.

Aspect 16: The apparatus of any of the Aspects 9-15, in which the application use case context information is received from a set of schedulers, each scheduler of the set of schedulers configured to collect application use case context information from respective subsystems in the SoC.

Aspect 17: An apparatus, comprising: means for receiving application use case context information for context-aware safety management for an advanced driver-assistance system (ADAS) and/or an autonomous driving system-on-a-chip (SoC); means for selecting a group of components of the SoC for running a selected subset of diagnostic procedures based on application use case context information; means for identifying the selected subset of diagnostic procedures based on the group of components of the SoC associated with the use case context information, the selected subset of diagnostic procedures being a subset of stored diagnostic procedures; means for triggering the selected subset of diagnostic procedures; and means for performing the selected subset of diagnostic procedures based on the triggering.

Aspect 18: The apparatus of Aspect 17, in which the means for triggering the selected subset of diagnostic procedures is a dedicated diagnostics trigger pin and the application use case context information is received from a system scheduler, the system scheduler configured to collect application use case context information.

Aspect 19: The apparatus of Aspect 17 or 18, in which: the application use case context information is received from the SoC; the means for triggering the selected subset of diagnostic procedures is a global safety monitor; and the SoC comprises a group of functional blocks and a local safety monitor, the local safety monitor being the means for performing the selected subset of diagnostic procedures based on the triggering.

Aspect 20: The apparatus of any of the Aspects 17-19, in which the application use case context information is received from a set of schedulers, each scheduler of the set of schedulers configured to collect application use case context information from respective subsystems in the SoC.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method, comprising:

receiving, during run time execution of functional operations of an advanced driver-assistance system (ADAS) and/or autonomous driving system-on-a-chip (SoC) and from one or more schedulers, run time application use case context information for context-aware safety management for the (SoC);

selecting a group of components of the ADAS and/or autonomous driving SoC for running diagnostic procedures based on the application use case context information;

identifying a selected subset of diagnostic procedures based on the group of components of the ADAS and/or autonomous driving SoC associated with the use case context information, the selected subset of diagnostic procedures being a subset of stored diagnostic procedures and being selected to reduce overhead associated with the diagnostic procedures during the run time execution of the functional operations;

triggering the selected subset of diagnostic procedures while the functional operations continue executing on the SoC; and performing the selected subset of diagnostic procedures based on the triggering.

2. The method of claim 1, in which the triggering the selected subset of diagnostic procedures is via a dedicated diagnostics trigger pin.

3. The method of claim 1, in which the application use case context information is received from the ADAS and/or autonomous driving SoC and the triggering the selected subset of diagnostic procedures is via a global safety monitor.

4. The method of claim 3, in which the SoC comprises a group of functional blocks and a local safety monitor, the local safety monitor performing the selected subset of diagnostic procedures based on the triggering.

5. The method of claim 1, in which the triggering the selected subset of diagnostic procedures occurs once every fault tolerant time interval (FTTI).

6. The method of claim 1, further comprising triggering periodic baseline tests in addition to the selected subset of diagnostic procedures.

7. The method of claim 1, in which the application use case context information is received from a system scheduler, the system scheduler configured to collect application use case context information.

8. The method of claim 1, in which the application use case context information is received from a set of schedulers, each scheduler of the set of schedulers configured to collect application use case context information from respective subsystems in the ADAS and/or autonomous driving SoC.

9. An apparatus, comprising:

an advanced driver-assistance system (ADAS) and/or an autonomous driving system-on-a-chip (SoC) configured to perform a selected subset of diagnostic procedures based on a triggering while functional operations continue executing on the SoC; and a controller configured:

to select a group of components of the ADAS and/or autonomous driving SoC for running diagnostic procedures based on run time application use case context information received during run time execution of the functional operations of the SoC and from one or more schedulers;

to identify a selected subset of diagnostic procedures based on the group of components of the ADAS and/or autonomous driving SoC associated with the use case context information, the selected subset of diagnostic procedures being a subset of stored diagnostic procedures and being selected to reduce overhead associated with the diagnostic procedures during the run time execution of the functional operations; and to trigger the selected subset of diagnostic procedures.

10. The apparatus of claim 9, in which the controller is external to the ADAS and/or autonomous driving SoC.

11. The apparatus of claim 10, in which the controller further comprises a global safety monitor that triggers the selected subset of diagnostic procedures.

12. The apparatus of claim 9, in which the controller is internal to the ADAS and/or autonomous driving SoC.

13. The apparatus of claim 9, in which the controller further comprises a dedicated diagnostics trigger pin that is coupled to the ADAS and/or autonomous driving SoC.

14. The apparatus of claim 9, in which the ADAS and/or autonomous driving SoC further comprises a group of functional blocks and a local safety monitor, the local safety monitor performing the selected subset of diagnostic procedures based on the triggering.

15. The apparatus of claim 9, in which the ADAS and/or autonomous driving SoC further comprises a system scheduler configured to collect application use case context information.

16. The apparatus of claim 9, in which the application use case context information is received from a set of schedulers, each scheduler of the set of schedulers configured to collect application use case context information from respective subsystems in the ADAS and/or autonomous driving SoC.

17. An apparatus, comprising:

means for receiving, during run time execution of functional operations of an advanced driver-assistance system (ADAS) and/or autonomous driving system-on-a-chip (SoC) and from one or more schedulers, run time application use case context information for context-aware safety management for the advanced driver-assistance system (ADAS) and/or autonomous driving system-on-a-chip (SoC);

means for selecting a group of components of the ADAS and/or autonomous driving SoC for running diagnostic procedures based on the application use case context information;

means for identifying a selected subset of diagnostic procedures based on the group of components of the ADAS and/or autonomous driving SoC associated with the use case context information, the selected subset of diagnostic procedures being a subset of stored diagnostic procedures and being selected to reduce overhead associated with the diagnostic procedures during the run time execution of the functional operations;

means for triggering the selected subset of diagnostic procedures while the functional operations continue executing on the SoC; and means for performing the selected subset of diagnostic procedures based on the triggering.

18. The apparatus of claim 17, in which the means for triggering the selected subset of diagnostic procedures is a dedicated diagnostics trigger pin and the application use case context information is received from a system scheduler, the system scheduler configured to collect application use case context information.

19. The apparatus of claim 17, in which:

the application use case context information is received from the ADAS and/or autonomous driving SoC;

the means for triggering the selected subset of diagnostic procedures is a global safety monitor; and the ADAS and/or autonomous driving SoC comprises a group of functional blocks and a local safety monitor, the local safety monitor being the means for performing the selected subset of diagnostic procedures based on the triggering.

20. The apparatus of claim 17, in which the application use case context information is received from a set of schedulers, each scheduler of the set of schedulers configured to collect application use case context information from respective subsystems in the ADAS and/or autonomous driving SoC.

* * * * *